United States Patent [19]
Farr

[11] 3,759,093
[45] Sept. 18, 1973

[54] LINEAR LOAD CELL BRIDGE INCLUDING A NON-LINEAR STRAIN SENSITIVE ELEMENT

[76] Inventor: Emory W. Farr, 830 Del Cerro Ave., West Covina, Calif. 91791

[22] Filed: Nov. 10, 1971

[21] Appl. No.: 197,413

[52] U.S. Cl. .............................................. 73/141 A
[51] Int. Cl. ............................................... G01l 5/18
[58] Field of Search ...................... 73/88.5, 141 A; 324/57, 62; 323/75, 75 B

[56] References Cited
UNITED STATES PATENTS

| | | | |
|---|---|---|---|
| 3,085,193 | 4/1963 | Perino | 323/75 B X |
| 3,178,938 | 4/1965 | Ruge | 73/141 A |
| 3,228,240 | 1/1966 | Ormond | 73/88.5 R X |
| 3,245,252 | 4/1966 | First et al. | 73/88.5 R |

Primary Examiner—Richard C. Queisser
Assistant Examiner—Stephen A. Kreitman
Attorney—Christensen & Sanborn

[57] ABSTRACT

To compensate for non-linearities in a bridge circuit comprising a plurality of strain gauge transducers arranged to provide an output signal proportional to the load on a member, a non-linear strain sensitive element is mounted in the area of the member sensitive to load strain and electrically connected in series in one arm of the bridge. A matching non-linear strain sensitive element is mounted in an area of the member not sensitive to load strain and is connected in an adjacent arm of the bridge to compensate for temperature-dependent non-linearities.

8 Claims, 2 Drawing Figures

Patented Sept. 18, 1973

3,759,093

INVENTOR,
EMORY W. FARR
BY
Christensen & Sanborn
ATTORNEYS

LINEAR LOAD CELL BRIDGE INCLUDING A NON-LINEAR STRAIN SENSITIVE ELEMENT

FIELD OF THE INVENTION

This invention generally relates to load cells, and, more particularly, to a strain gauge bridge therefor whose output varies linearly with applied load.

BACKGROUND OF THE INVENTION

A load cell of a column type construction comprises a deformable member which is placed in an effective position to sense an applied force or load. Included are a plurality of strain gauge transducers which are disposed on the deformable member so as to sense tension and compression forces therein. The strain gauge transducers are electrically connected in a bridge circuit to provide an output signal which varies proportionally with changes in the internal resistances thereof and thus with changes in the applied load.

In practice, the output signal varies non-linearly with applied load. There are at least three reasons for this nonlinearity. First, the applied force results in an actual physical change in the cross-sectional area of the load cell. Second, the electrical characteristics of the bridge are non-linear because it is not possible to realize a perfect constant current in the arms thereof. Third, the physical properties of the strain gauges are non-linear and temperature sensitive.

One approach in the prior art to compensate for this non-linearity has been the mounting of at least one additional strain gauge on the deformable member so as to be responsive to changes in the strain loading thereof, and the electrical connection of this additional compensating strain gauge in circuit with either the input or output diagonals of the bridge circuit. That is, the compensating strain gauge is connected externally of the bridge circuit, either in circuit with the input leads from a bridge power supply, or in circuit with the output leads to an indicator therefor.

In operation, the compensating transducer reduces non-linearity in the bridge output signal by directly modifying the exciting signal supplied to the bridge, or the output signal therefrom.

This approach is disadvantageous in that the circuit connection of the compensating transducer, and its component value, must be changed for varied applications of the load cell. Thus, one connection and component value is required for a low-impedance power supply, another for a high-impedance power supply, yet another for a low-impedance indicator, and still another for a high-impedance indicator.

It is therefore an object of this invention to provide a load cell whose output signal varies linearly with changes in applied load.

It is a further object of this invention to provide such a load cell whose bridge circuit is compensated for non-linearity, notwithstanding the impedance or type of input and output connections thereto.

SUMMARY OF THE INVENTION

These objects and others, which will be realized from a consideration of the following portions of the specification, are achieved, briefly, by a bridge circuit including a compensating non-linear strain gauge connected in one arm thereof and mounted on a deformable member of the load cell so as to be responsive to load strain therein, and further including a matching element connected in an adjacent arm of the bridge circuit.

BRIEF DESCRIPTION OF THE DRAWINGS

The invention can perhaps best be understood by consideration of the following portion of the specification, taken in conjunction with the accompanying drawings, in which.

DESCRIPTION OF THE PREFERRED EMBODIMENT

Figure 1:
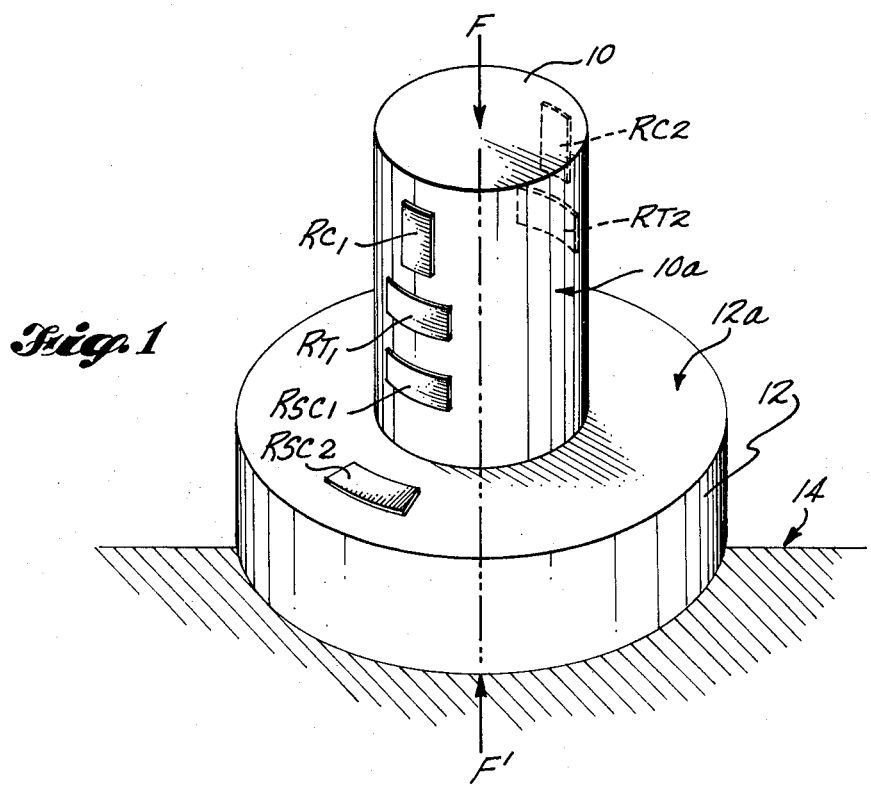
FIG. 1 is a pictorial diagram showing a typical column type load cell and the manner in which the strain gauges are mounted thereon.

With particular reference now to FIG. 1, the load cell includes a first portion 10, of generally cylindrical configuration, having a surface 10a which is sensitive to load strain resulting from an applied force F. The load cell also includes a second portion 12, also of generally cylindrical configuration having a surface 12a which is not sensitive to load strain resulting from the applied force F. The load cell is supported on a stationary surface 14, and a force F', equal and opposite to force F, acts thereon.

In accordance with well-known practice, first and second compression strain gauges $R_{C1}$, $R_{C2}$ mounted on surface 10a in diametrically-opposing positions, as are first and second tension strain gauges $R_{T1}$, $R_{T2}$. In normal practice strain gauges $R_{C1}$, $R_{C2}$, $R_{T1}$, and $R_{T2}$ are connected in a bridge circuit having input and output terminals. An exciting voltage is applied from a power supply across the input terminals thereof, and an output signal is derived from the exciting voltage by the transducers and appears across the output terminals thereof. This output signal results from changes in the internal resistance of each strain gauge due to changes in the applied load F. The strain gauges are normally metallic conductors having a resistance change to strain (gauge factor) of 2 to 4.

To compensate for non-linearity, a preferred embodiment utilizes non-linear strain gauge $R_{SC1}$ mounted on surface 10a so as to be sensitive to tension forces and connected in one arm of the bridge. This strain gauge may comprise a semiconductor type due to advantages afforded by a high gauge factor (approximately 50 times that of metallic conductors) and an inherent non-linear resistance change with strain.

Figure 2:
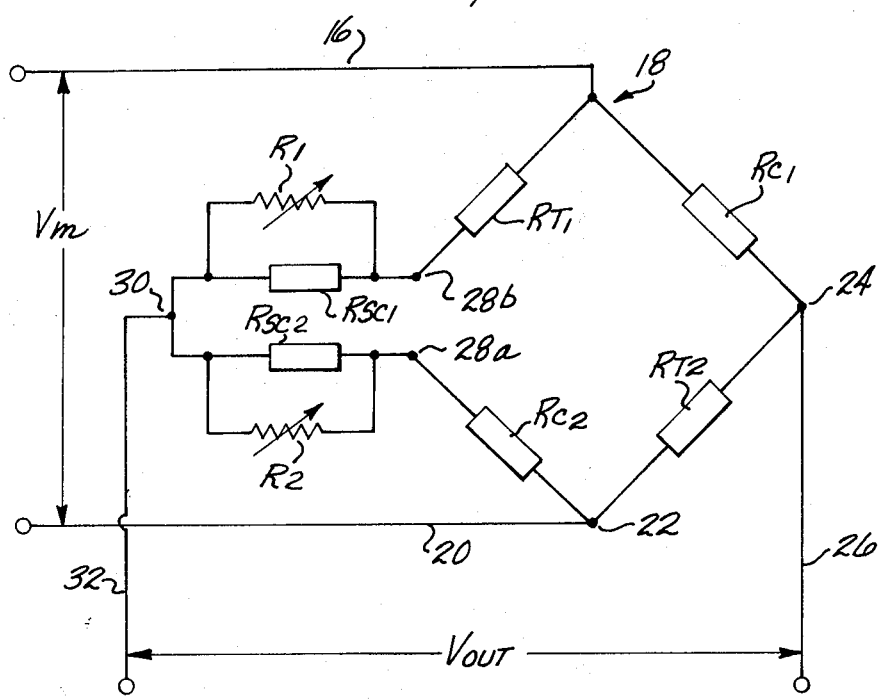
FIG. 2 is a schematic diagram of the load cell bridge circuit of this invention.

With particular reference to FIG. 2, a power supply produces an exciting voltage $V_m$ which is applied by input leads 16 and 20 to input terminals or nodes 18, 22 of the bridge circuits. An output signal appears across the output terminals or nodes 24, 30 thereof, and is coupled by leads 26 and 32 to an appropriate indicator means or control circuitry, not shown. Strain gauge $R_{C1}$ is connected from input node 18 to output node 24, and strain gauge $R_{T2}$ is connected from input node 22 to output node 24. The arm of the bridge from input node 18 to output node 30 includes the series connection of strain gauge $R_{T1}$ and compensating non-linear strain gauge $R_{SC1}$. The arm of the bridge from input node 22 to output node 30 includes the series connection of strain gauge $R_{C2}$ and a matching element for strain gauge $R_{SC1}$, which, in FIG. 2, is shown to be a second non-linear strain gauge $R_{SC2}$. With reference back to FIG. 1, strain gauge $R_{SC2}$ is mounted on surface 12a and thus is not sensitive to strain as a result of the applied load F.

The normal strain gauge bridge includes an output node having a junction of strain gauges $R_{T1}$ and $R_{C2}$. In accordance with the present invention, this common node is split into two separate nodes 28a, 28b, by the introduction of the compensating non-linear strain gauge, and its matching element in the bridge.

The configuration in FIG. 2 as an example uses the normally non-linear properties of a semiconductor strain gauge to compensate for bridge non-linearities. Therefore, since the compensating semiconductor strain gauge $R_{SC1}$ is mounted on the surface 10a the change in resistance thereof varies non-linearly with strain, and thus with changes in the applied load F. The matching element, such as $R_{SC2}$, must be chosen to have a nominal value equal to that of $R_{SC1}$, when no load F is being applied to the load cell. In this manner, only the non-linear variations of $R_{SC1}$ are effectively "seen" by the bridge circuit. If desired, $R_{SC2}$ may be of a semiconductor type identical to that of $R_{SC1}$ to compensate for temperature-caused non-linearities in the bridge.

In order to fully compensate for non-linearities in the bridge output signal, first and second trimming resistors $R_1$, $R_2$, may be placed in shunt with semiconductor strain gauges $R_{SC1}$ and $R_{SC2}$, respectively. By appropriate choice of the types and nominal values of the semiconductor strain gauges $R_{SC1}$, $R_{SC2}$, and by appropriate adjustment of trimming resistors $R_1$ and $R_2$, compensation can be effected.

Alternative embodiments would include the bonding of the compensating non-linear strain gauge to surface 10a so as to be responsive to compression forces resulting from the applied load F and the connection of the compensating transducer and its matching element in other arms of the bridge.

In any case, the placement of the compensating semiconductor strain gauge within the bridge allows the bridge to be used with practically any configuration or power supply or indicator, as neither the bridge excitation nor the output signal are directly influenced by the action of the compensating transducer. Since the effect is symmetrical, the compensation technique will also apply with the force (F) opposite to that shown in FIG. 1.

While this invention has been described with respect to a preferred embodiment, it is to be clearly understood by those skilled in the art that the invention is not limited thereto, but rather is intended to be bounded only by the limits of the appended claims.

I claim as my invention:

1. A load cell for measuring an applied force comprising:
   a. a member having a first surface deformable as a result of said applied force, and a second surface which is not so deformable,
   b. a plurality of transducers mounted on said first surface,
   c. a compensating non-linear strain sensitive element mounted on said first surface,
   d. a matching element for said compensating non-linear strain sensitive element mounted on said second surface, and
   e. means connecting said plurality of transducers into a bridge circuit having a plurality of arms, and further including means connecting said compensating non-linear strain sensitive element in one of said arms and said matching element in an adjacent one of said arms, whereby said bridge circuit produces an output signal which varies linearly with changes in said applied force.

2. A load cell as recited in claim 1, wherein said compensating non-linear strain sensitive element comprises a semiconductor transducer.

3. A load cell as recited in claim 2, wherein said matching element comprises a semiconductor transducer.

4. A load cell as recited in claim 3, wherein said matching element is of the same type and nominal value as said compensating semiconductor transducer.

5. A load cell as recited in claim 1, further including first and second trimming elements connected in shunt with said compensating non-linear strain sensitive element and said matching element, respectively.

6. A load cell as recited in claim 5, wherein said first and second trimming elements comprise variable resistors having the same nominal value.

7. A load cell as recited in claim 1, wherein one of said plurality of transducers, and said compensating non-linear strain sensitive element, are mounted on said first surface so as to be sensitive to axial forces exerted on said member, and further including means connecting said one of said plurality of transducers and said compensating non-linear strain sensitive element in series in one arm of said bridge circuit.

8. A load cell as recited in claim 1, wherein one of said plurality of transducers, and said compensating non-linear strain sensitive element, are mounted on said first surface so as to be sensitive to lateral (or transverse) forces exerted on said member, and further including means connecting said one of said plurality of transducers and said compensating non-linear strain sensitive element in series in one arm of said bridge.

* * * * *

UNITED STATES PATENT OFFICE
CERTIFICATE OF CORRECTION

Patent No. 3,759,093                    Dated September 18, 1973

Inventor(s) Emory W. Farr

It is certified that error appears in the above-identified patent and that said Letters Patent are hereby corrected as shown below:

On the cover sheet insert -- [73] Assignee

Electro Development Corporation, Lynnwood, Washington --.

Signed and sealed this 26th day of February 1974.

(SEAL)
Attest:

EDWARD M. FLETCHER, JR.          C. MARSHALL DANN
Attesting Officer                Commissioner of Patents